Jan. 31, 1939. P. J. PEDRO 2,145,525
WHEEL
Filed Sept. 9, 1936 2 Sheets-Sheet 2
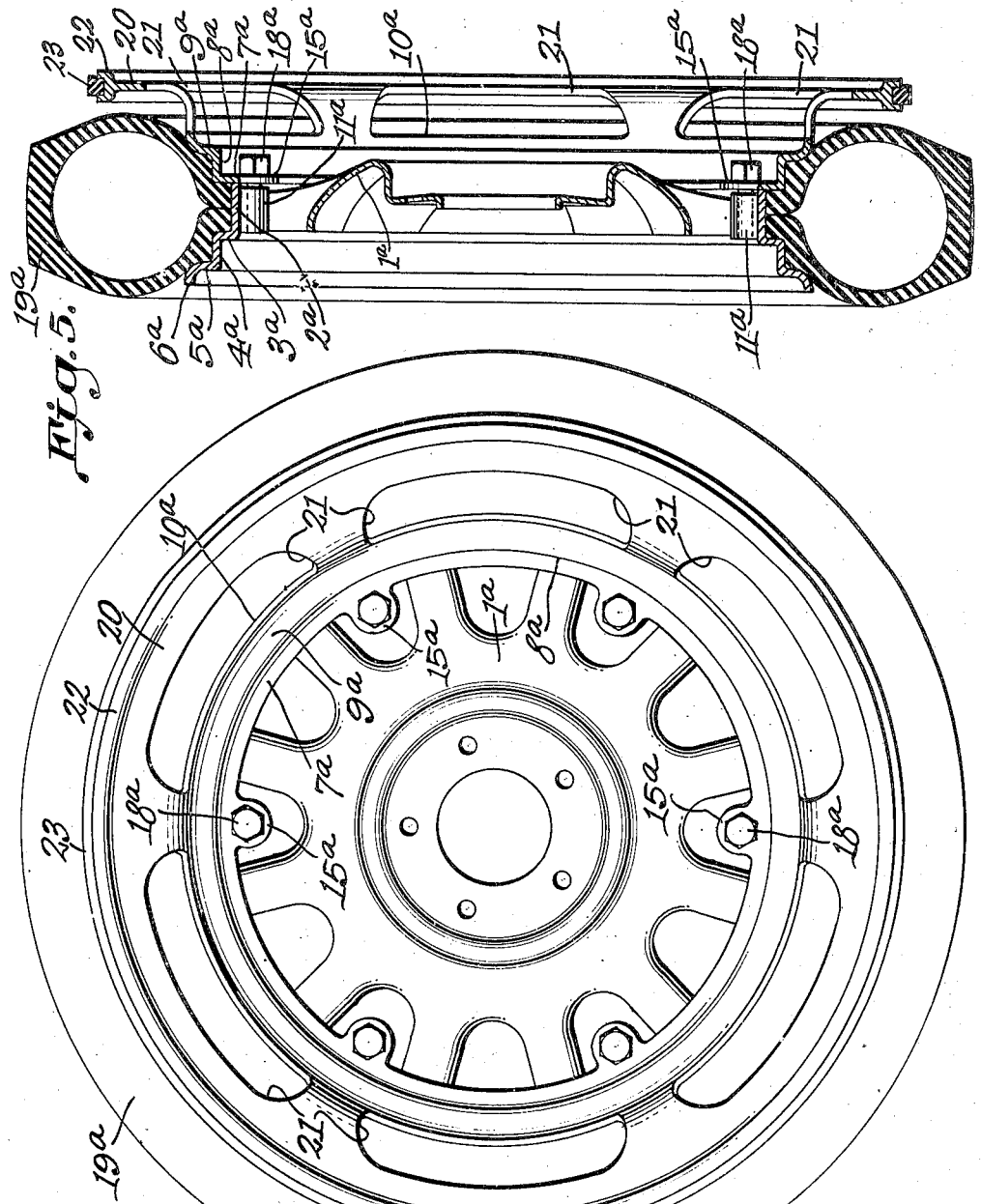
Inventor
Philip J. Pedro Patented Jan. 31, 1939

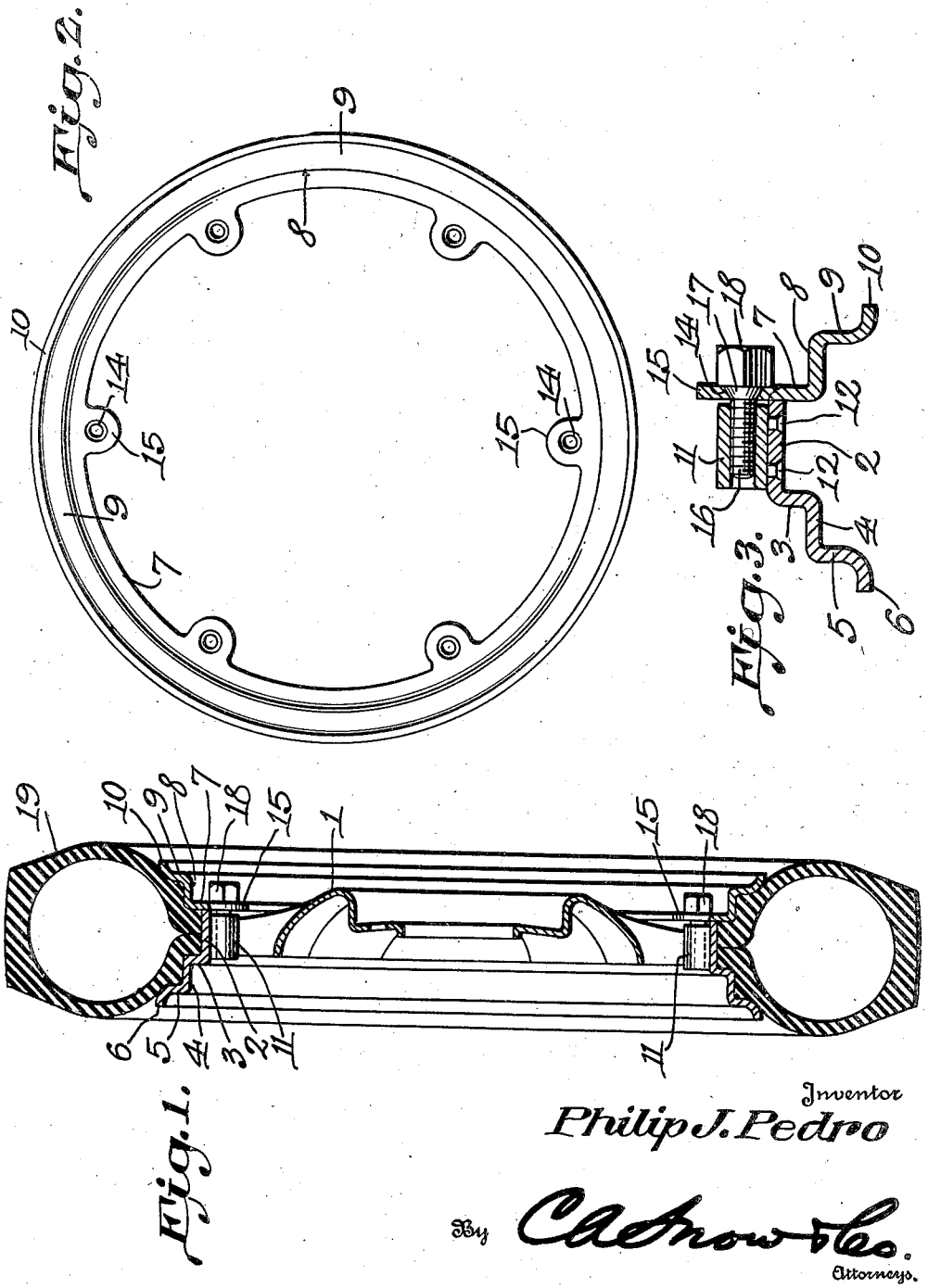

2,145,525

UNITED STATES PATENT OFFICE 2,145,525

WHEEL

Philip J. Pedro, Shreveport, La.

Application September 9, 1936, Serial No. 100,044

1 Claim. (Cl. 301—39)

One object of this invention is to provide a novel means whereby a drop-center vehicle tire may be assembled easily with a wheel body, and be removed easily from the wheel body. Another object of the invention is to supply a device of the class described having a novel safety wheel which comes into play when the tire on the wheel body is punctured or rendered inoperative otherwise.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in vertical transverse section, a device constructed in accordance with the invention;

Fig. 2 is a side elevation of the ring;

Fig. 3 is a transverse section wherein the vehicle tire and other parts have been omitted;

Fig. 4 is a side elevation showing a modification;

Fig. 5 is a transverse section of the structure delineated in Fig. 4.

In Figs. 1, 2 and 3, there is shown a wheel body 1, having a peripheral, transverse, annular base 2, provided along one edge with a side wall 3 of annular form, the side wall being equipped at its outer edge with a laterally extended annular flange 4, supplied with an outwardly extended annular wing 5, terminating in a curved lip 6. A ring 7 abuts against the opposite edge of the base 2 and is provided with a flange 8, a wing 9 and a lip 10, duplicating the correspondingly named parts of the wheel body 1.

Means is provided for securing the ring 7 to the wheel body 1. That means preferably embodies circumferentially spaced lugs 11, secured in any desired way, for instance as indicated at 12, to the inner surface of the base 2 of the wheel body 1. In the ring 7 there are tapered seats 14, the seats preferably being located in inwardly extended projections 15 on the ring 7. Securing elements 16, such as machine screws, are threaded into the lugs 11 and have tapered portions 17 engaged in the tapered seats 14 of the ring 7, the securing elements 16 being supplied with heads 18 that bear against the outer lateral surfaces of the projections 15 of the ring 7.

It is obvious that by removing the securing elements 16, the ring 7 may be detached from the wheel body, thereby facilitating the mounting and demounting of a drop-center tire 19 on the wheel body. The construction of the device is such that a tire can be changed easily and quickly by women and children, and other persons disinclined to heavy or dirty work, or not skilled in the task of tire changing.

In Figs. 4 and 5, parts hereinbefore described have been designated by numerals previously used, with the suffix "a".

In this form of the invention, there is shown a removable safety flange comprising the wing 9a, the ring 7a and a laterally offset and outwardly extended safety wheel or ground-engaging tread 20, which, for the sake of lightness and economy of material, may be supplied with openings 21. The safety wheel 20 may have a channel rim 22, carrying a solid tire 23, or any other kind of tire. The diameter of the safety wheel 20 is less than the diameter of the wheel body 1a and the tire 19a, and the tire, ordinarily, is in contact with the ground. If, however, the tire 19a becomes punctured or otherwise inoperative, the safety wheel 20 comes into contact with the ground and prevents the usual drop which is attendant upon a blow-out or puncture.

A purchaser may supply himself with the wheel body, having the parts 2, 3, 4, 5 and 6, and then he may buy either the ring 7 of Fig. 2, or the ring 7a equipped with the safety wheel 20; or if he prefers, he can have both of these instrumentalities at his command, substituting one for the other as occasion may require or as his judgment may dictate.

The device shown, described and claimed, will be found useful on tractors as well as automobiles, trailers and other vehicles.

Owing to the fact that the securing elements or machine screws 16 have the tapered portions 17, the ring 7 will keep its upright position when the tire 19 becomes deflated, there being then, an unusual load on the device.

Having thus described the invention, what is claimed is:

In a device of the class described, a wheel body having means for engaging one side of a tire to hold the tire on the wheel body, a removable safety flange engaging the opposite side of the tire to hold the tire on the wheel body, the safety flange comprising a ring and a laterally-offset portion of greater diameter than the ring and adapted to form a ground-engaging tread upon excessive deflation of the tire, and means for attaching the safety flange to the wheel body.

PHILIP J. PEDRO.